US012547900B2

(12) United States Patent
Barkan et al.

(10) Patent No.: US 12,547,900 B2
(45) Date of Patent: Feb. 10, 2026

(54) VISUAL SEARCH AND DISCOVERY VIA GENERATIVE MODEL INVERSION

(71) Applicant: Microsoft Technology Licensing, LLC, Redmond, WA (US)

(72) Inventors: Oren Barkan, Tel Aviv (IL); Nir Zabari, Jerusalem (IL); Tal Reiss, Tel-Aviv (IL); Noam Koenigstein, Tel Aviv (IL); Nir Nice, Tel Aviv (IL)

(73) Assignee: Microsoft Technology Licensing, LLC., Redmond, WA (US)

( * ) Notice: Subject to any disclaimer, the term of this patent is extended or adjusted under 35 U.S.C. 154(b) by 940 days.

(21) Appl. No.: 17/746,869

(22) Filed: May 17, 2022

(65) Prior Publication Data

US 2023/0376778 A1   Nov. 23, 2023

(51) Int. Cl.

| | |
|---|---|
| *G06N 3/088* | (2023.01) |
| *G06F 16/53* | (2019.01) |
| *G06F 16/532* | (2019.01) |
| *G06F 16/56* | (2019.01) |
| *G06N 3/08* | (2023.01) |
| *G06N 20/00* | (2019.01) |
| *G06V 10/74* | (2022.01) |
| *G06V 10/774* | (2022.01) |

(52) U.S. Cl.
CPC .......... *G06N 3/088* (2013.01); *G06F 16/532* (2019.01); *G06F 16/56* (2019.01); *G06V 10/761* (2022.01); *G06V 10/7753* (2022.01); *G06F 16/53* (2019.01); *G06N 3/08* (2013.01); *G06N 20/00* (2019.01)

(58) Field of Classification Search
CPC .......... G06N 3/088; G06N 3/08; G06N 20/00; G06F 16/532; G06F 16/56; G06F 16/53; G06V 10/761; G06V 10/7753
See application file for complete search history.

(56) References Cited

U.S. PATENT DOCUMENTS 9,569,700 B1 *   2/2017   Santos ................ G06F 18/2113
2020/0019699 A1 *   1/2020   Araujo .................. G06N 3/045

OTHER PUBLICATIONS

Mohamed, et al., "An Efficient Face Image Retrieval through DCT Features", In Proceedings of Signal and Image Processing, Jan. 2008, 3 Pages.

(Continued)

*Primary Examiner* — Quoc A Tran
(74) *Attorney, Agent, or Firm* — Foley IP Law, PLLC

(57) ABSTRACT

Solutions for visual search and discovery include performing unsupervised training of a generative adversarial network that has a generator and an assessor. Training the generative adversarial network involves alternating training the assessor with the generator and a plurality of catalog images with training the generator with the assessor. The catalog images are inverted into catalog vectors by leveraging the trained generator. A query image is inverted into a query vector, and image similarity is determined by calculating a distance between the query vector and a catalog vector. In some examples, inversion is performed by training an encoder with the trained generator and inverting the catalog images with the encoder. In some examples, the trained generator is used to perform a search in a vector space. A weighting vector may be used to weight elements of the vectors, effectively prioritizing image features for image similarity determination.

20 Claims, 15 Drawing Sheets

(56) References Cited

OTHER PUBLICATIONS

"International Search Report and Written Opinion issued in PCT Application No. PCT/US23/017012", Mailed Date: Jun. 23, 2023, 15 Pages.

Zhang, et al., "The Secret Revealer: Generative Model-Inversion Attacks Against Deep Neural Networks", In Proceedings of the IEEE/CVF Conference on Computer Vision and Pattern Recognition, Apr. 18, 2020, 12 Pages.

Karras, et al., "Analyzing and Improving the Image Quality of StyleGAN", In Proceedings of IEEE/CVF Conference on Computer Vision and Pattern Recognition, Jun. 13, 2020, pp. 8110-8119.

* cited by examiner

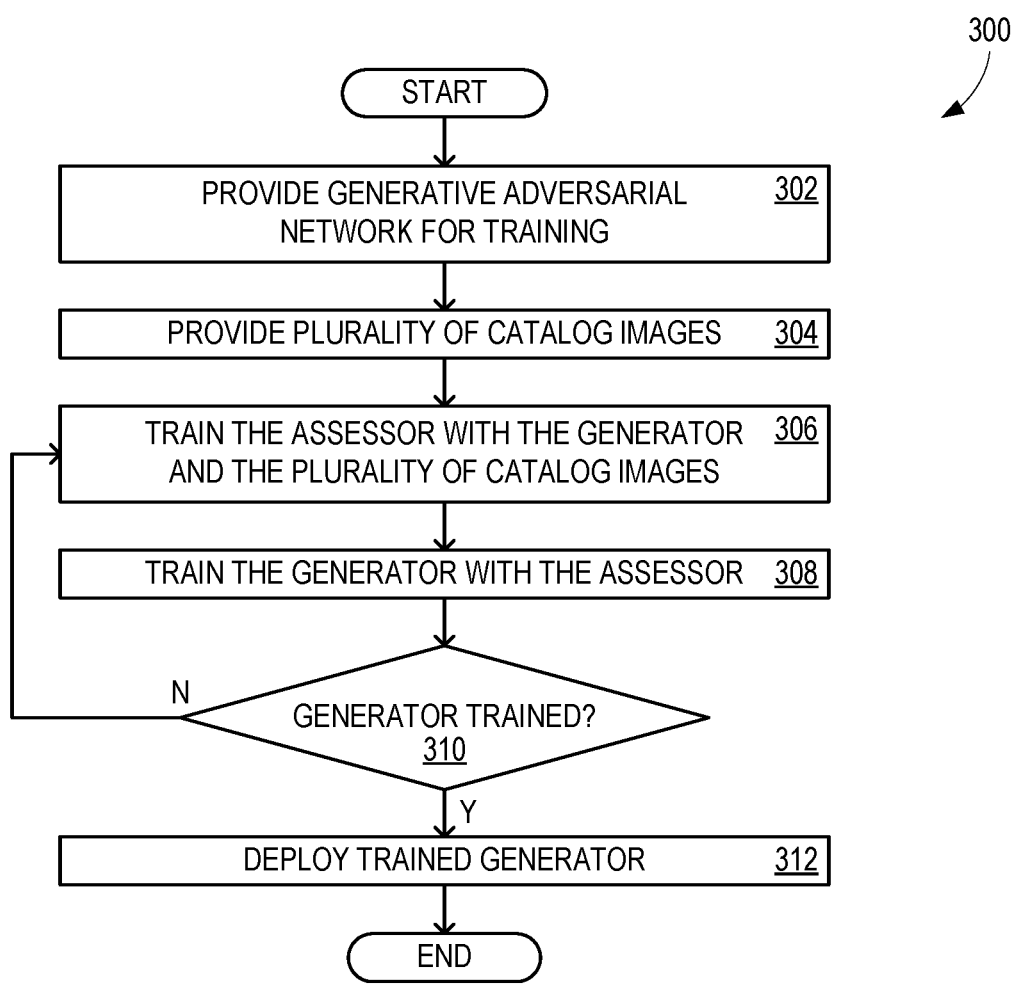

VISUAL SEARCH AND DISCOVERY VIA GENERATIVE MODEL INVERSION

BACKGROUND

Visual similarity between images is traditionally assessed using image features, such as locally and globally descriptors extracted by hand, or more recently using deep neural networks (NNs), such as convolutional NNs (CNNs), transformer NNs, and others. Visual search and discovery engines thus rely heavily on features extracted by deep NNs and image descriptors. These features tend to focus on specific attributes, which largely depends on the supervision during the NN training.

A representative application of visual search and discovery involves a user providing a catalog of images, for example a catalog of products offered on a website. A website visitor may provide an indication of interest in some product (either directly, or inferred by the website visitor's activity), and the website endeavors to locate other products, within the catalog of images, that are similar to that identified by the website visitor. By showing the website visitor only a focused (limited) set of additional product images, prioritized by similarity to the product of initial interest, the website is able to provide the visitor with an enhanced experience.

Such a representative application of visual search and discovery may be expected to perform better when the visual search and discovery engine is trained on the user's catalog of products. Unfortunately, many users do not label the images in their catalogs. Providing labels may be expensive and time consuming, representing an obstacle for custom training on the user's product line.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Solutions for visual search and discovery include: performing unsupervised training of a generative adversarial network comprising a generator and an assessor, wherein training the generative adversarial network comprises alternating: training the assessor with the generator and a plurality of catalog images; and training the generator with the assessor; and based on at least the trained generator, inverting the plurality of catalog images into a plurality of catalog vectors. The trained generator generates images in the spirit of the plurality of catalog images.

Solutions for visual search and discovery also include: inverting a plurality of catalog images into a plurality of catalog vectors; inverting a query image into a query vector; determining a similarity between the query image and each catalog image of a set of multiple catalog images, the set of multiple catalog images within the plurality of catalog images, wherein determining the similarity between the query image and a catalog image comprises: based on at least a weighting vector, determining a weighted distance between the query vector and a catalog vector of the plurality of catalog vectors that corresponds to the catalog image; sorting the weighted distances; and based on at least the sorted weighted distances, reporting the similarities according to prioritized image features.

BRIEF DESCRIPTION OF THE DRAWINGS

The disclosed examples are described in detail below with reference to the accompanying drawing figures listed below:

FIG. 3 shows a flowchart of example operations associated with some examples of the training configurations of FIGS. 2A and 2B;

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Solutions for visual search and discovery include performing unsupervised training of a generative adversarial network that has a generator and an assessor. Training the generative adversarial network involves alternating training the assessor with the generator and a plurality of catalog images with training the generator with the assessor. The catalog images are inverted into catalog vectors by leveraging the trained generator. A query image is inverted into a query vector, and image similarity is determined by calculating a distance between the query vector and a catalog vector. In some examples, inversion is performed by training an encoder with the trained generator and inverting the catalog images with the encoder. In some examples, the trained generator is used to perform a search in a vector space. A weighting vector may be used to weight elements of the vectors, effectively prioritizing image features for image similarity determination.

Aspects of the disclosure operate in an unconventional manner by performing unsupervised training of a generative adversarial network with unlabeled data. This improves the efficiency of training image similarity models (e.g., the generator and the encoder) by eliminating the need for acquiring large amounts of expensive labeled training data and performing supervised training. Further, because the training regimen is so efficient, models may be custom-trained for each user's image catalog.

Figure 1:
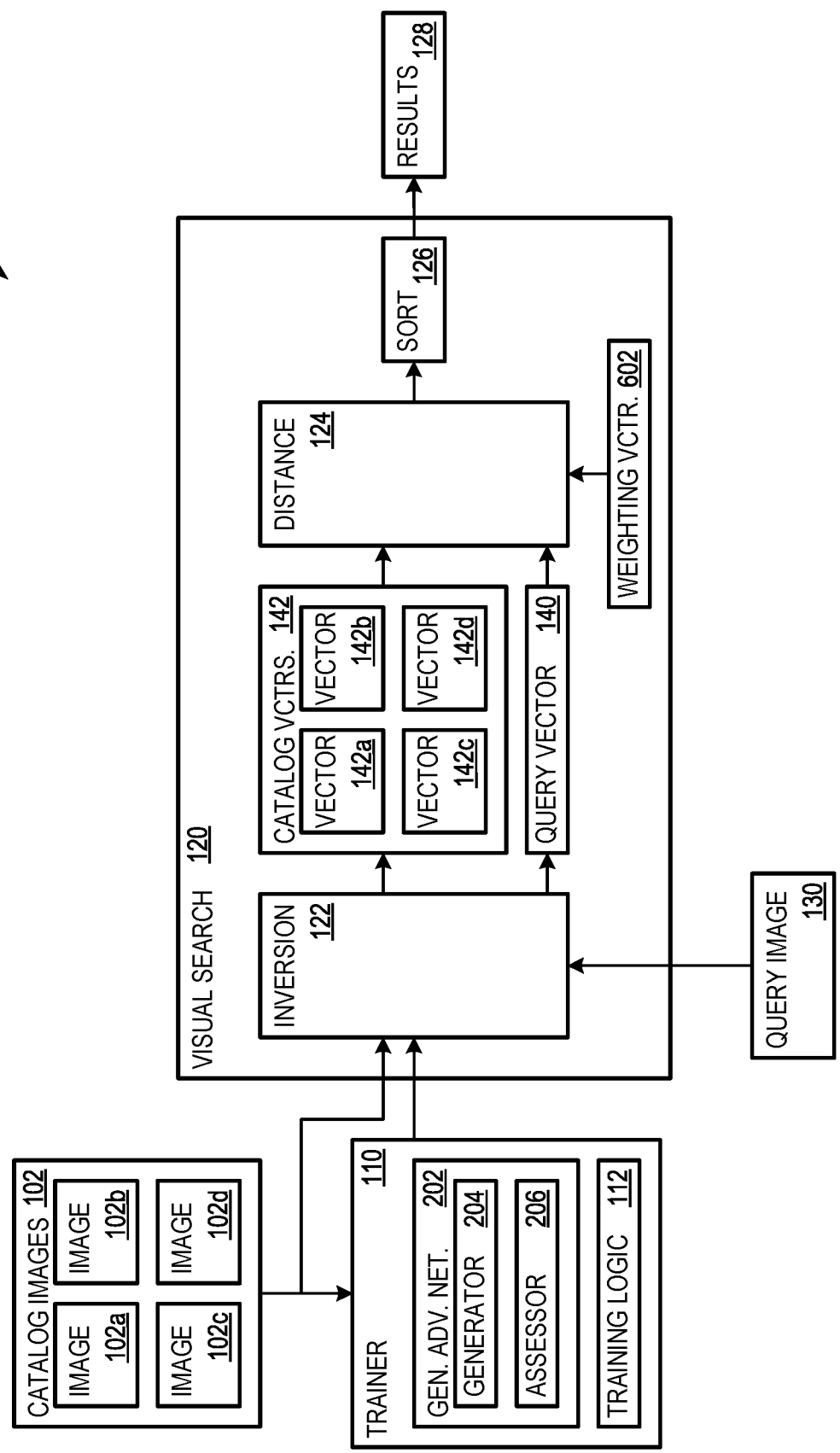
FIG. 1 illustrates an example arrangement 100 for visual search and discovery.
Figure 10:
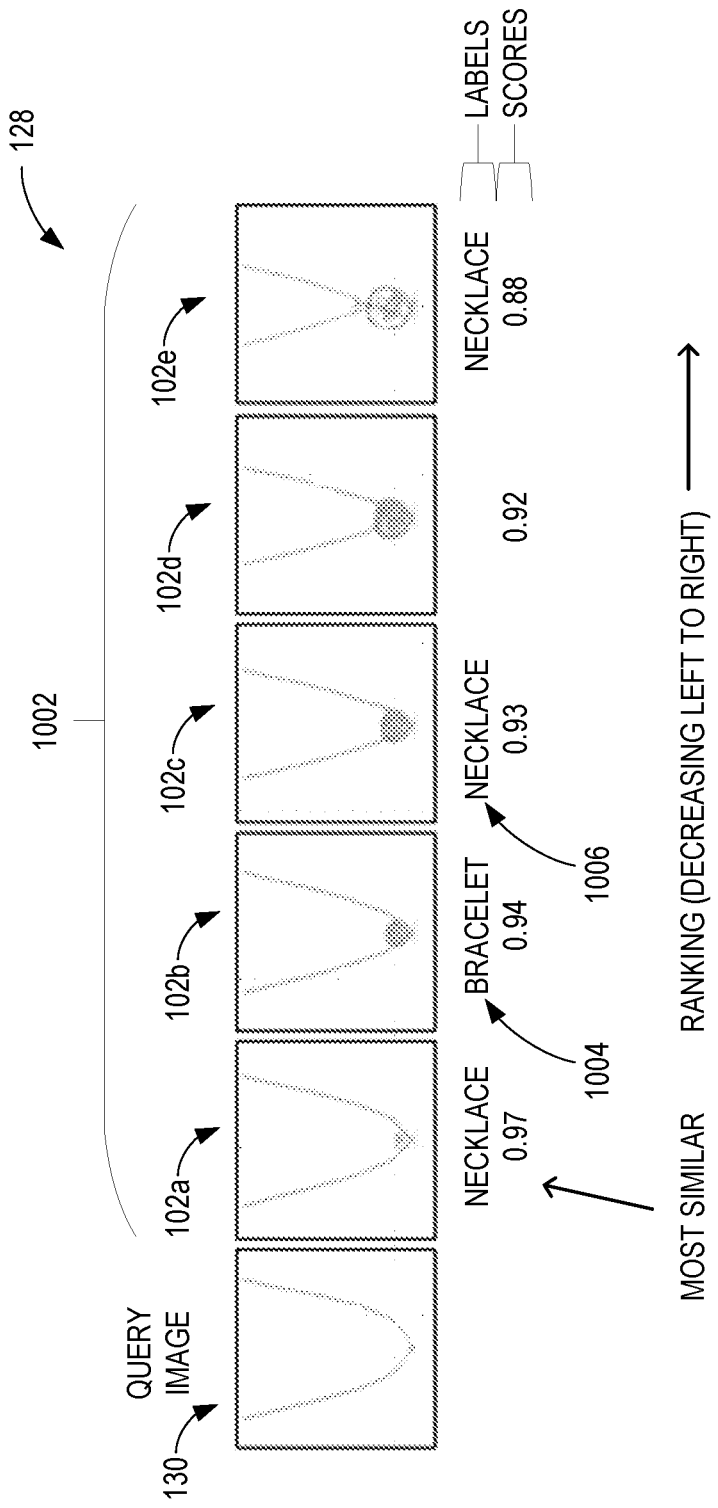
FIG. 10 illustrates example visual search results using the arrangement of FIG. 1.

FIG. 1 illustrates an arrangement 100 for visual search and discovery. In arrangement 100, a visual search component 120 intakes a query image 130 and identifies the most similar image in an image catalog, identified as plurality of catalog images 102. The output, results 128, may be an identification of a single image or a ranking of a set (e.g., more than one) of the most similar images. FIG. 10 provides an example view of possible results 128.

Plurality of catalog images 102 (e.g., the image catalog) is provided to a trainer 110 having training logic 112 that trains a generative adversarial network 202 using images in plurality of catalog images 102. Generative adversarial network 202 has a generator 204 and an assessor 206. In some examples, some or all of the images in plurality of catalog images 102 are unlabeled. Although only four images are illustrated in FIG. 1 (catalog image 102a, catalog image 102b, catalog image 102c, and catalog image 102d), it should be understood that plurality of catalog images 102 may have hundreds or thousands of images. Further detail on the training of generative adversarial network 202 is provided in relation to FIGS. 2A, 2B, and 3.

Figure 2A:
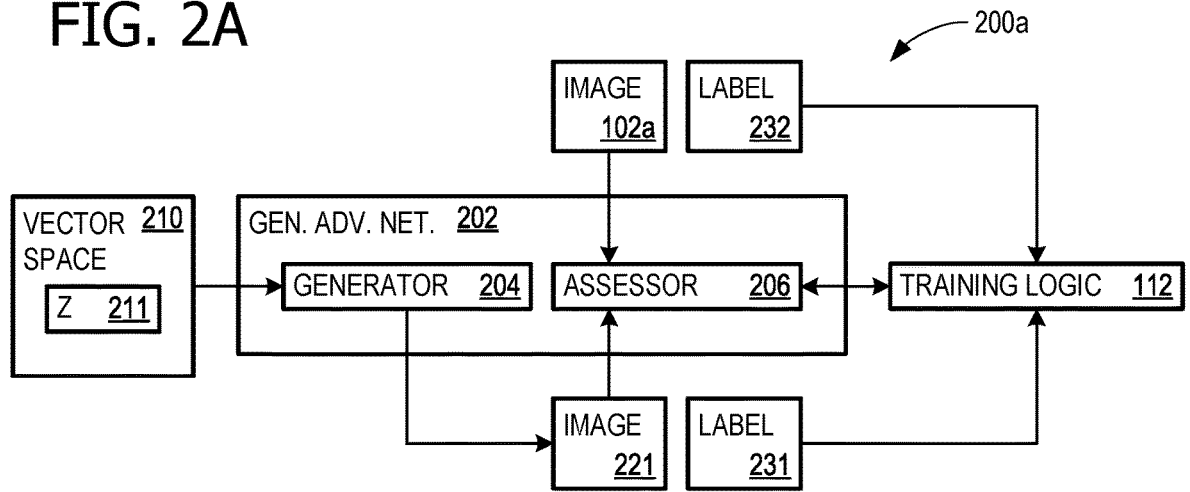
FIGS. 2A and 2B illustrate example training configurations for training a generative adversarial network, which is leveraged to provide underlying functional capability (e.g., inversion) for the arrangement of FIG. 1.
Figure 2B:
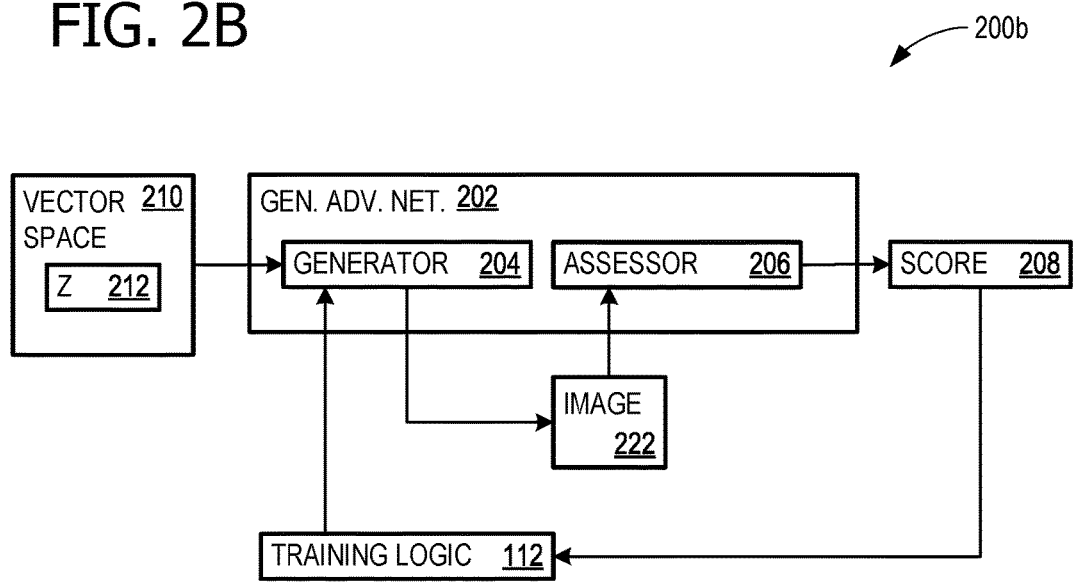

An inversion component 122 inverts query image 130 and plurality of catalog images 102 into vectors in a vector space 210 (see FIGS. 2A and 2B). Further detail on inversion component 122 is provided in relation to FIGS. 8A, 8B, and 9. In FIG. 1, query image 130 is inverted into query vector 140, and each of catalog images 102a-102d is inverted into catalog vectors in plurality of catalog vectors 142. Catalog vector 142a corresponds to catalog image 102a, catalog vector 142b corresponds to catalog image 102b, catalog vector 142c corresponds to catalog image 102c, and catalog vector 142d corresponds to catalog image 102d.

A distance calculator 124 determines a distance between query vector 140 and each catalog vector of some selected subset, up to all, of the plurality of catalog vectors that correspond so a set of multiple catalog images 1002 (shown in FIG. 10). A sorter 126 sorts the distances to find the most similar image, with the catalog vector having the smallest distance from query vector 140 corresponding to the catalog image that is the most similar to query image 130. The N highest-ranking catalog images, having the highest similarity (e.g., corresponding to the catalog vectors the N smallest distances) are reported in results 128.

When two vectors are identical the similarity is 1.0 and the distance is 0.0. In some examples, the distance calculation uses a Euclidean distance across the vector dimensions. Euclidean distance is the square root of the sum of squared differences between corresponding elements of the two vectors. The vectors may have hundreds or thousands of elements. In some examples, the distance calculation uses cosine similarity, which is proportional to the dot product of two vectors and inversely proportional to the product of their magnitudes. The cosine distance is found by:

$$\text{Cosine Distance} = 1 - \text{Cosine Similarity})  \quad \text{Eq. (1)}$$

Some examples use a different distance calculation. Some examples use a weighted distance, in which elements of the distance vector are weighted according to:

$$d(Z_i, Z_j) = \sum_{k=1}^{K} W_k \cdot (d(Z_i^k, Z_j^k)) \quad \text{Eq. (2)}$$

where $Z_i$ and $Z_j$ are the K-dimensional vectors for which distance is being determined, and $W_k$ is a weighting vector 602. Weighting vector 602 may be trained in order to prioritize certain image features when determining similarity. Further detail on the training of weighting vector 602 is provided in relation to FIGS. 6 and 7.

FIGS. 2A and 2B illustrate example training configurations 200a and 200b, respectively, for training generative adversarial network 202. Training configurations 200a and 200b alternate under the control of training logic 112 (e.g., starting with training configuration 200a, moving to training configuration 200b, then possibly back to training configuration 200a, . . . ) until some completion criteria is met (e.g., a number of cycles, and/or the performance of generator 204 reaching a threshold), completing with training configuration 200b. Generator 204 and assessor 206 are trained in an adversarial manner, advantageously reducing the need for labeled training data.

In training configuration 200a, assessor 206 is trained to differentiate between real and synthetic images using plurality of catalog images 102, providing real images, and generator 204 (in a frozen configuration), providing synthetic images. After an initial training period, determined by training logic 112, training configuration 200b is used to train generator 204 to attempt to induce assessor 206 (in a frozen configuration) to score synthetic images from generator 204 to be likely to be real (e.g., generator 204 attempts to trick assessor 206 into classifying a synthetic image as real). When trained, generator 204 generates images in the spirit of plurality of catalog images 102.

This alternating of training configurations 200a and 200b is described below in further detail in relation to FIG. 3. This scheme advantageously provides unsupervised training in small data scenarios (e.g., hundreds of unlabeled images), whereas prior visual search solutions have traditionally required supervised (or at least semi-supervised) training with large sets of labeled training data (e.g., millions of labeled images).

Referring now to FIG. 2A, training configuration 200a, an initial vector 211 (Z 211) from vector space 210 is input into generator 204 to generate a synthetic image 221. A label 231 identifies synthetic image 221 as synthetic and is provided to training logic 112. Catalog image 102a (of plurality of catalog images 101) is also provided to assessor 206. A label 232 identifies catalog image 102a as a real image and is also provided to training logic 112. Although labels 231 and 232 are used to identify a real versus synthetic image, this may be distinguished from using "labeled training data" because images in plurality of catalog images 101 may not be labeled according to content (i.e., what the image contains).

Training logic 112 monitors the response of assessor 206 in attempting to distinguish real versus synthetic images, and using label 231 and 232 is able to provide feedback to assessor 206 to improve the performance of assessor 206. The loss function for training assessor 206 will be set to maximize the likelihood of properly differentiating between real and synthetic imagery, and/or maximizing a likelihood score difference between real and synthetic imagery. After some number of images has been processed by training configuration 200a, assessor 206 is frozen and training shifts to training of generator 204 in training configuration 200b.

As shown in FIG. 2B, in training configuration 200b, an initial vector 212 from vector space 210 is input into generator 204 to generate a synthetic image 222. Synthetic image 222 is provided to assessor 206, which outputs a score 208 indicating the likelihood of synthetic image 222 being real (as determined by assessor 206). The intent of training in training configuration 200b is for generator 204 to produce (generate) such realistic-appearing synthetic images that assessor 206 cannot distinguish between real images from plurality of catalog images 101 and synthetic images output from generator 204. The loss function for training generator 204 will be set to maximize score 208.

Training logic 112 monitors the response of assessor 206 (e.g., score 208) and provides feedback to generator 204 to improve the performance of generator 204. After some number of images has been processed by training configuration 200b, generator 204 is frozen and training either completed for generator 204, or else (as determined by training logic 112) training shifts back to training of assessor 206 in training configuration 200a.

FIG. 3 shows a flowchart 300 of operations associated with some examples of the training configurations 200a and 200b. In some examples, operations described for flowchart 300 are performed by computing device 1400 of FIG. 14. Flowchart 300 commences with operation 302, in which generative adversarial network 202, comprising generator 204 and assessor 206, is provided for training by trainer 110. The training of flowchart 300 is unsupervised training. In some examples, generator 204 comprises an NN, and assessor 206 comprises an NN. Plurality of catalog images 102 is made available for training in operation 304.

Training generative adversarial network 202 comprises alternating operations 306 and 308 until training logic 112 determines, in decision operation 310, that generator 204 is sufficiently trained. Operation 306 trains assessor 206 with generator 204 and plurality of catalog images 102, as described above in relation to training configuration 200a. Operation 308 trains generator 204 with assessor 206, as described above in relation to training configuration 200b. Upon completion of training generator 204, assessor 206 is no longer needed (unless there will be further training of generator 204), and generator 204 is deployed in operation 312.

Figure 4A:
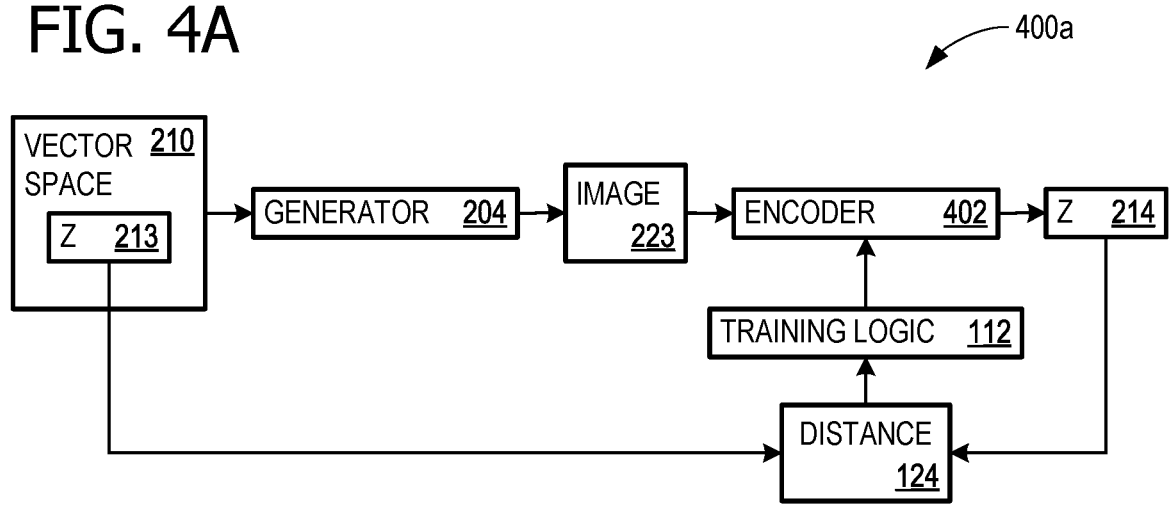
FIGS. 4A and 4B illustrate example training configurations for training an encoder, which is used in some examples of the arrangement of FIG. 1.
Figure 4B:
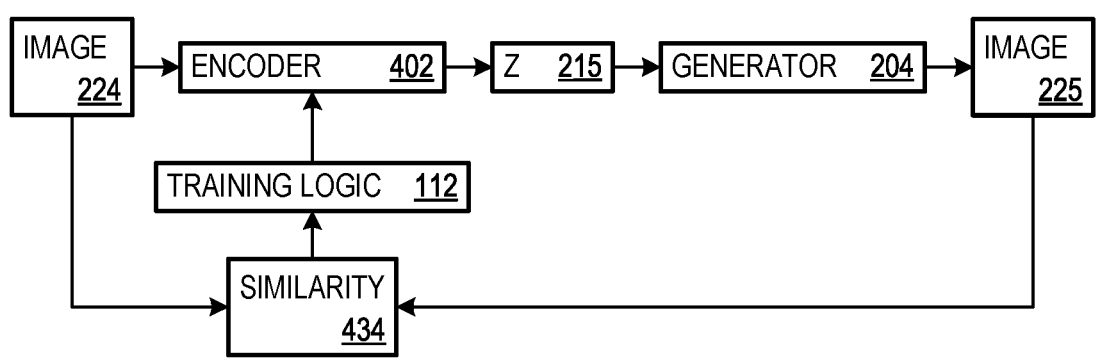
Figure 8A:
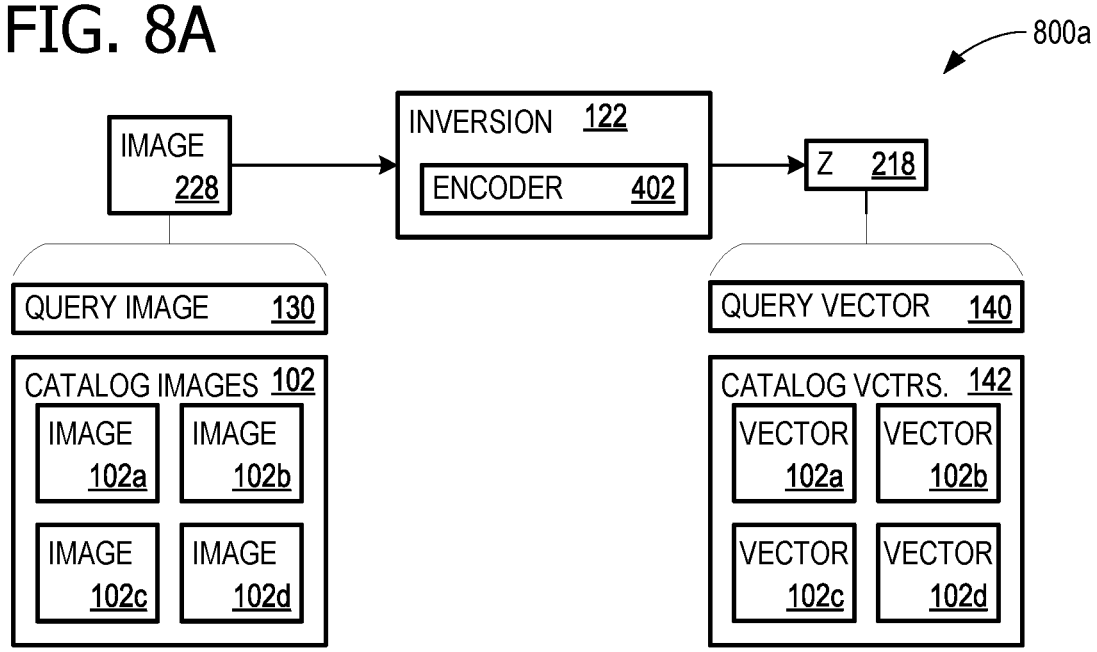
FIG. 8A illustrates performing inversion (e.g., for the arrangement of FIG. 1) using some examples of the encoder of FIGS. 4A and 4B.

FIGS. 4A and 4B illustrate example training configurations 400a and 400b for training an encoder 402. Encoder 402 is used, in some examples, to provide inversion, such as by acting as inversion component 122. This scenario is shown in FIG. 8A. In some examples, in both training configurations 400a and 400b, generator 204 remains frozen and only encoder 402 is trained.

Referring first to training configuration 400a in FIG. 4A, an initial vector 213 (Z 213) from vector space 210 is input into generator 204 to generate a synthetic image 223. Synthetic image 223 is provided to encoder 402, which inverts synthetic image 223 into a vector 214. Distance calculator 124 determines a distance between vector 214 and initial vector 213, which is provided to training logic 112. Training logic 112 trains encoder 402 to minimize this distance.

Figure 5A:
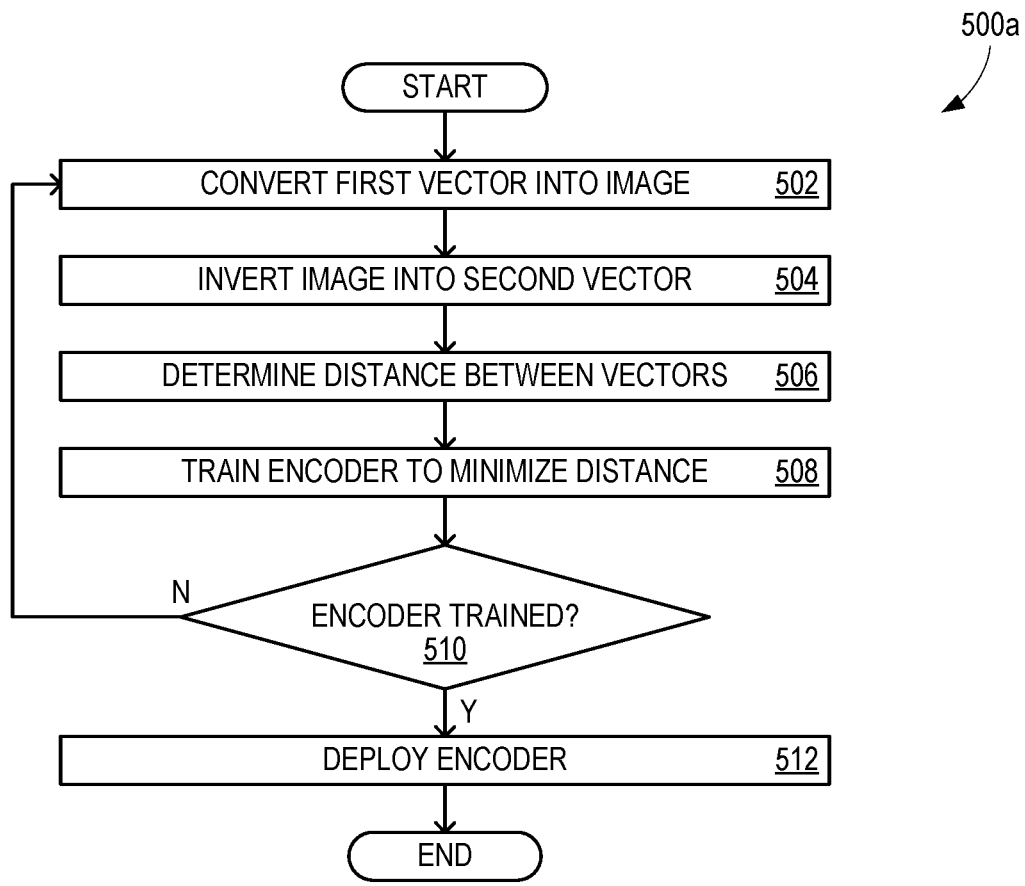
FIGS. 5A and 5B show flowcharts of example operations associated with some examples of the training configurations of FIGS. 4A and 4B, respectively.

Turning briefly to FIG. 5A, a flowchart 500a of operations associated with training configuration 400a is shown. In some examples, operations described for flowchart 500a are performed by computing device 1400 of FIG. 14. Flowchart 500a trains encoder 402 with trained generator 204 and commences with operation 502, which converts vector 213 into synthetic image 223 (using generator 204). Operation 504 inverts synthetic image 223 into vector 214 (using encoder 402). Operation 506 determines a distance between vectors 213 and 214, which is used by training logic 112 to train encoder 402 in operation 508. When the training of encoder 402 has reached a satisfactory level, as determined by decision operation 510, encoder 402 is deployed in operation 512. Otherwise, flowchart 500a returns to operation 502 to continue training of encoder 402 with a new version of vector 213.

Referring now to FIG. 4B, an alternative training configuration 400b is shown for training encoder 402. An image 224 is provided to encoder 402, which inverts image 224 into a vector 215 (Z 215). Vector 215 is input into generator 204 to generate a synthetic image 225. Synthetic image 225 is compared for similarity with image 224 by an image similarity comparator 434. Image similarity comparisons are known in the art. Any suitable solution may be employed for image similarity comparator 434 that returns a quantified difference (e.g., a distance) between synthetic image 225 and image 224. This difference is provided to training logic 112. Training logic 112 trains encoder 402 to minimize this difference.

In some examples, in training configuration 400b, the loss function for training encoder 402 is provided as:

$$\text{Loss} = \|X - G(E(X))\|_p \qquad \text{Eq. (3)}$$

for some p>0, where X is image 224, E(X) is the vector output of encoder 402 operating on image 224 (e.g., vector 215), and G(E(X)) is image 422 that is output by generator 204 operating on vector 413.

Figure 5B:
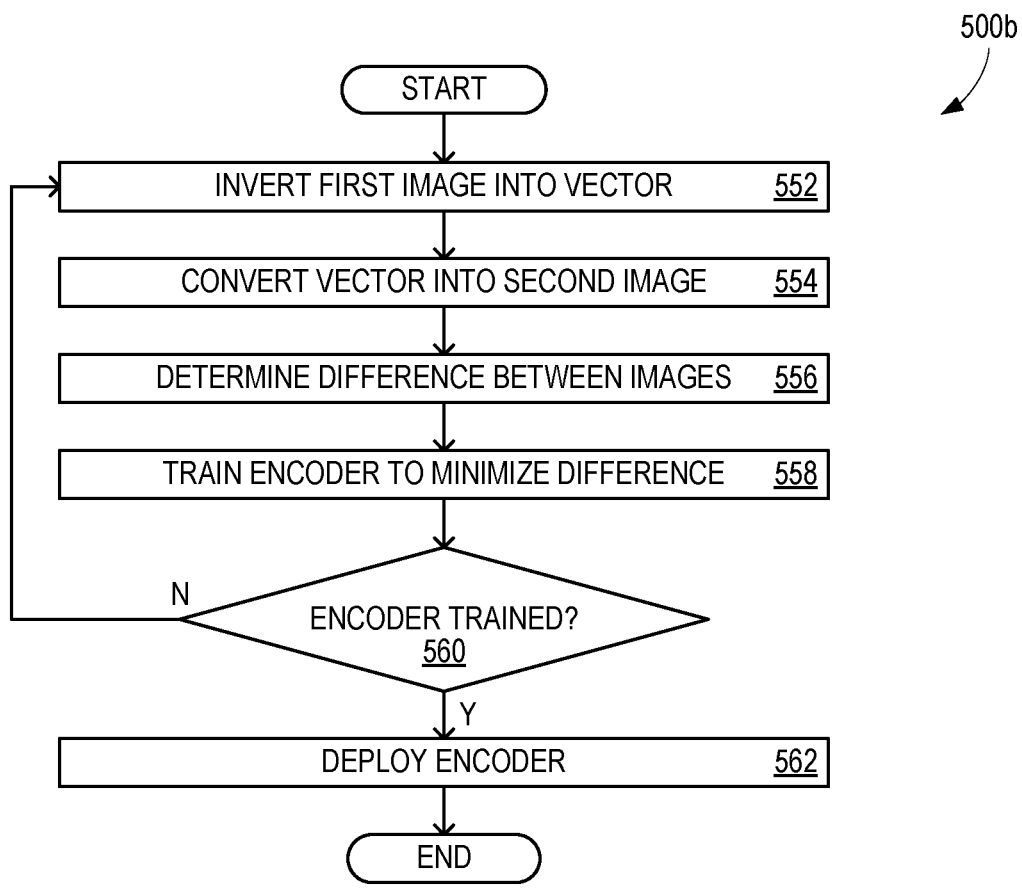

FIG. 5B shows a flowchart 500b of operations associated with training configuration 400a of FIG. 4B. In some examples, operations described for flowchart 500b are performed by computing device 1400 of FIG. 14. Flowchart 500b trains encoder 402 with trained generator 204 and commences with operation 522, which inverts image 224 into vector 215 (using encoder 402). Operation 554 converts vector 215 into synthetic image 225 (using generator 204). Operation 556 determines a difference between image 224 and synthetic image 225, which is used by training logic 112 to train encoder 402 in operation 558. When the training of encoder 402 has reached a satisfactory level, as determined by decision operation 560, encoder 402 is deployed in operation 562. Otherwise, flowchart 500b returns to operation 552 to continue training of encoder 402 with a new version of image 224.

Figure 6:
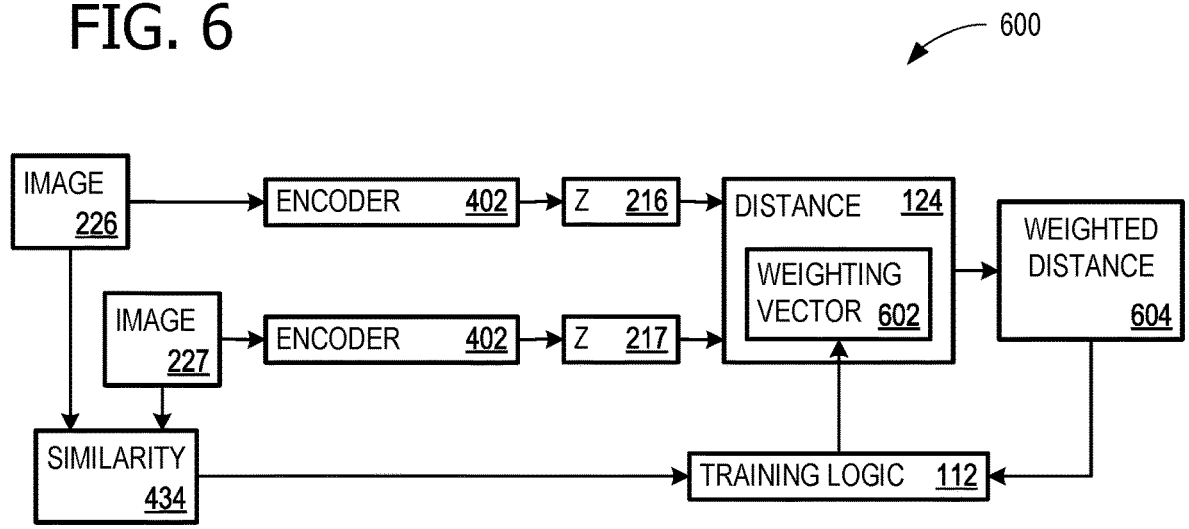
FIG. 6 illustrates an example training configuration for training a weighting vector, which is used in some examples of the arrangement of FIG. 1.

FIG. 6 illustrates an example training configuration 600 for learning weighting vector 602. An image 226 is provided to encoder 402, which inverts image 226 into a vector 216 (Z 216), and another image 227 is also provided to encoder 402, which inverts image 227 into a vector 217 (Z 217). Distance calculator 124 determines a weighted distance 604 between vectors 216 and 217, using weighting vector 602, and which is provided to training logic 112.

Additionally, image similarity comparator 434 determines a quantified difference between images 226 and 227, which is also provided to training logic 112. Training logic 112 learns weighting vector 602 so that weighted distance 604 is minimized when the difference between images 226 and 227 is minimized. In some examples, the minimization of the difference between images 226 and 227 may be somewhat subjective and guided by a user prioritizing image features.

Figure 7:
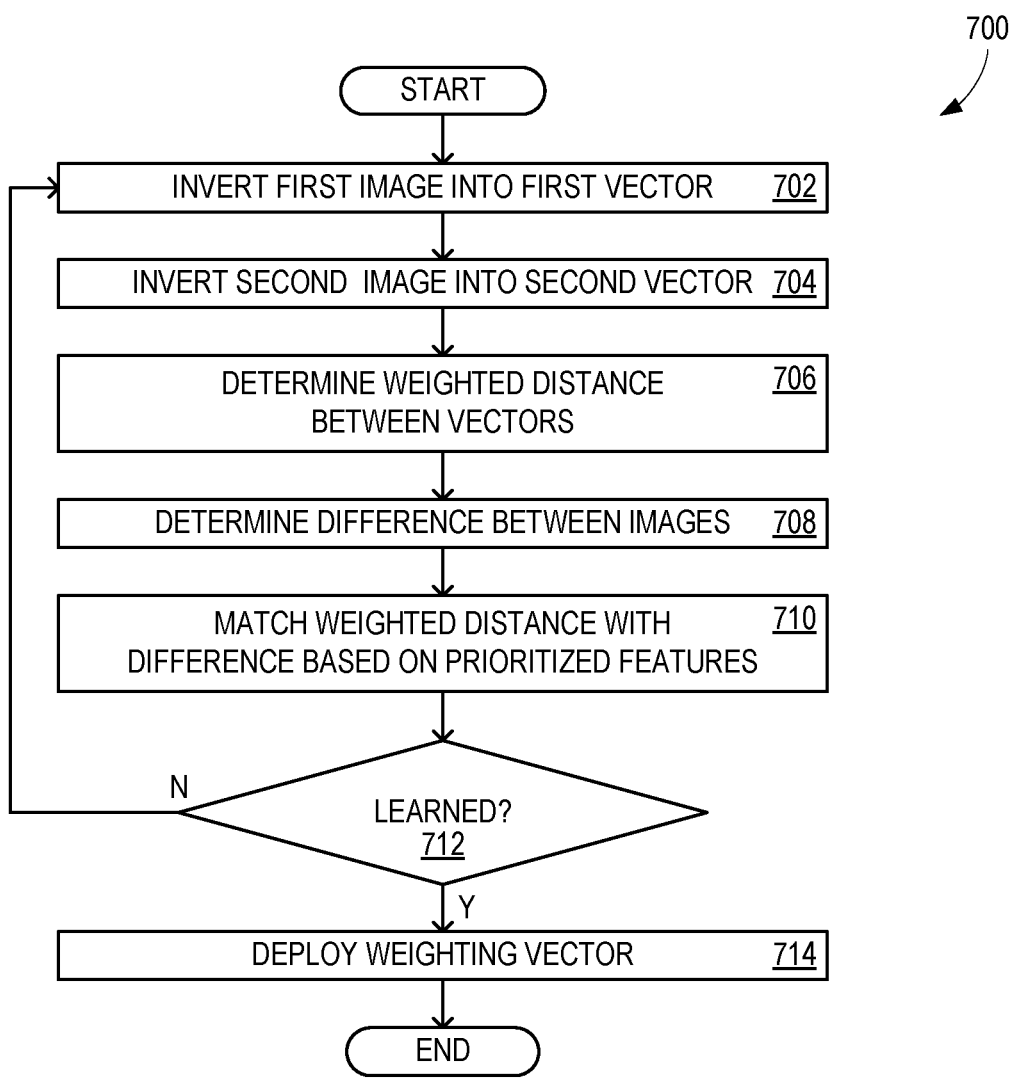
FIG. 7 shows a flowchart of example operations associated with some examples of the training configuration of FIG. 6.

FIG. 7 shows a flowchart 700 of operations associated with some examples of training configuration 600. In some examples, operations described for flowchart 700 are performed by computing device 1400 of FIG. 14. Flowchart 700 learns weighting vector 602 and commences with operation 702, which inverts image 226 into vector 216. Operation 704 inverts image 227 into vector 217, respectively, and operation 706 determines weighted distance 604 between vectors 216 and 217.

Operation 708 determines a quantified difference between images 226 and 227. In operation 710, training logic 112 matches weighted distance 604 from operation 706 with the quantified difference determined in operation 708. Decision operation 712 determines whether weighting vector 602 has been adjusted such that weighted distance 604 is minimized when prioritized featured in images 226 and 227 are most similar. When performance of weighting vector 602 has reached a satisfactory level, as determined by decision operation 712, weighting vector 602 is deployed in operation 714. Otherwise, flowchart 700 returns to operation 702 to continue learning weighting vector 602 with new versions of images 226 and 227.

FIG. 8A illustrates an arrangement 800a for performing inversion using encoder 402. In arrangement 800a, an image 228 is provided to inversion component 122, which inverts image 228 (directly) into a vector 218 (Z 218) in vector space 210. In arrangement 800a, inversion component 122 comprises encoder 402. As indicated, image 228 represents any of query image 130 and catalog images 102a-102d of plurality of catalog images 102, and vector 218 represents any of query vector 140 and catalog vectors 142a-142d of plurality of catalog vectors 142.

Figure 8B:
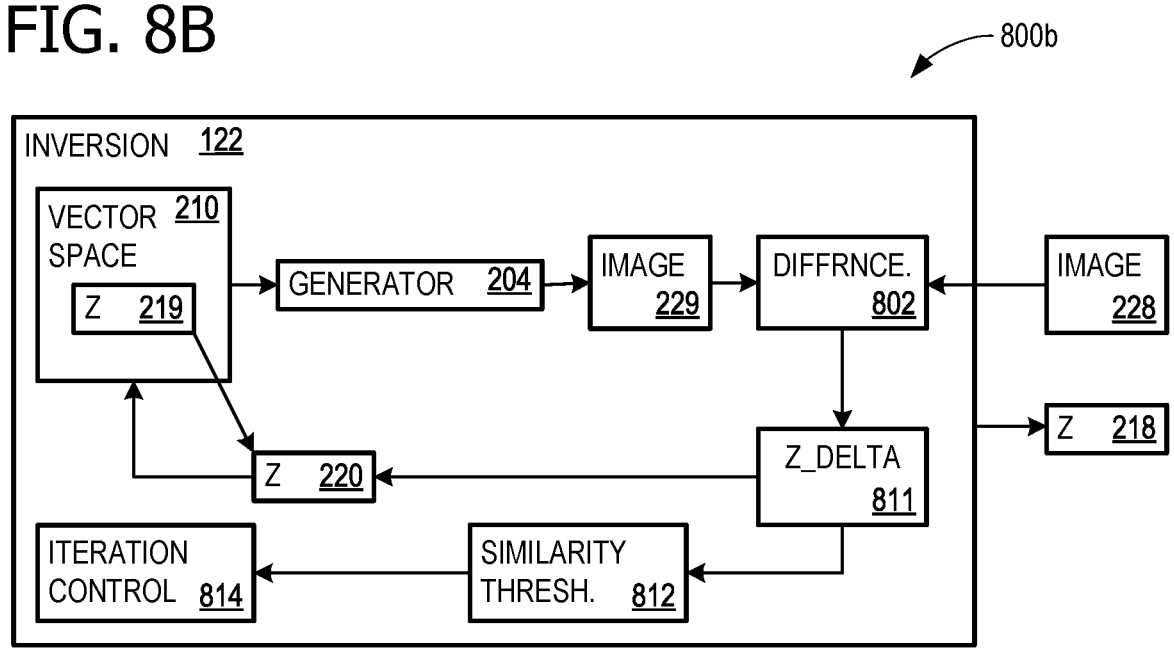
FIG. 8B illustrates performing inversion (e.g., for the arrangement of FIG. 1) using a component of some examples of the generative adversarial network of FIGS. 2A and 2B.

FIG. 8B illustrates an alternative arrangement 800b for performing inversion of image 228 into vector 218 using generator 204 (rather than encoder 402). Arrangement 800b searches vector space 210 to find a vector that, when fed into generator 204, produces an image (trial image 229) that is as close as possible to image 228, and then reports that vector as vector 218.

In arrangement 800b, an initial trial vector 219 is fed into generator 204 to produce an initial version of trial image 229. An image difference component 802, which in some examples may use image similarity comparator 434, determines a correction vector 811 (Z_delta 811) according to:

$$Z_\Delta = \mathrm{argmin}(\|X - G(Z)\|_p) \quad \text{Eq. (4)}$$

for some p>0, where $Z_\Delta$ is correction vector 811 (Z_delta 811), X is image 228, Z is trial vector 219, and G (Z) is trial image 229.

If correction vector 811 is above a similarity threshold 812 (i.e., trial image 229 is not yet sufficiently similar to image 228), iteration control 814 continues iterating (cycling) through different versions of trial vector 219 and trial image 229. Trial vector 219 is adjusted into a new vector 220, using correction vector 811, which may be an addition or subtraction of trial vector 219 and correction vector 811. Trial vector 219 is set to new vector 220, and fed into generator 204 to produce a new version of trial image 229. This iteration continues until correction vector 811 is below similarity threshold 812.

When correction vector 811 is below similarity threshold 812 (i.e., trial image 229 is sufficiently similar to image 228), iteration control 814 stops iterating (cycling) through different versions of trial vector 219, and trial image 229, and returns trial vector 219 as vector 218, the inversion of image 228.

Figure 9:
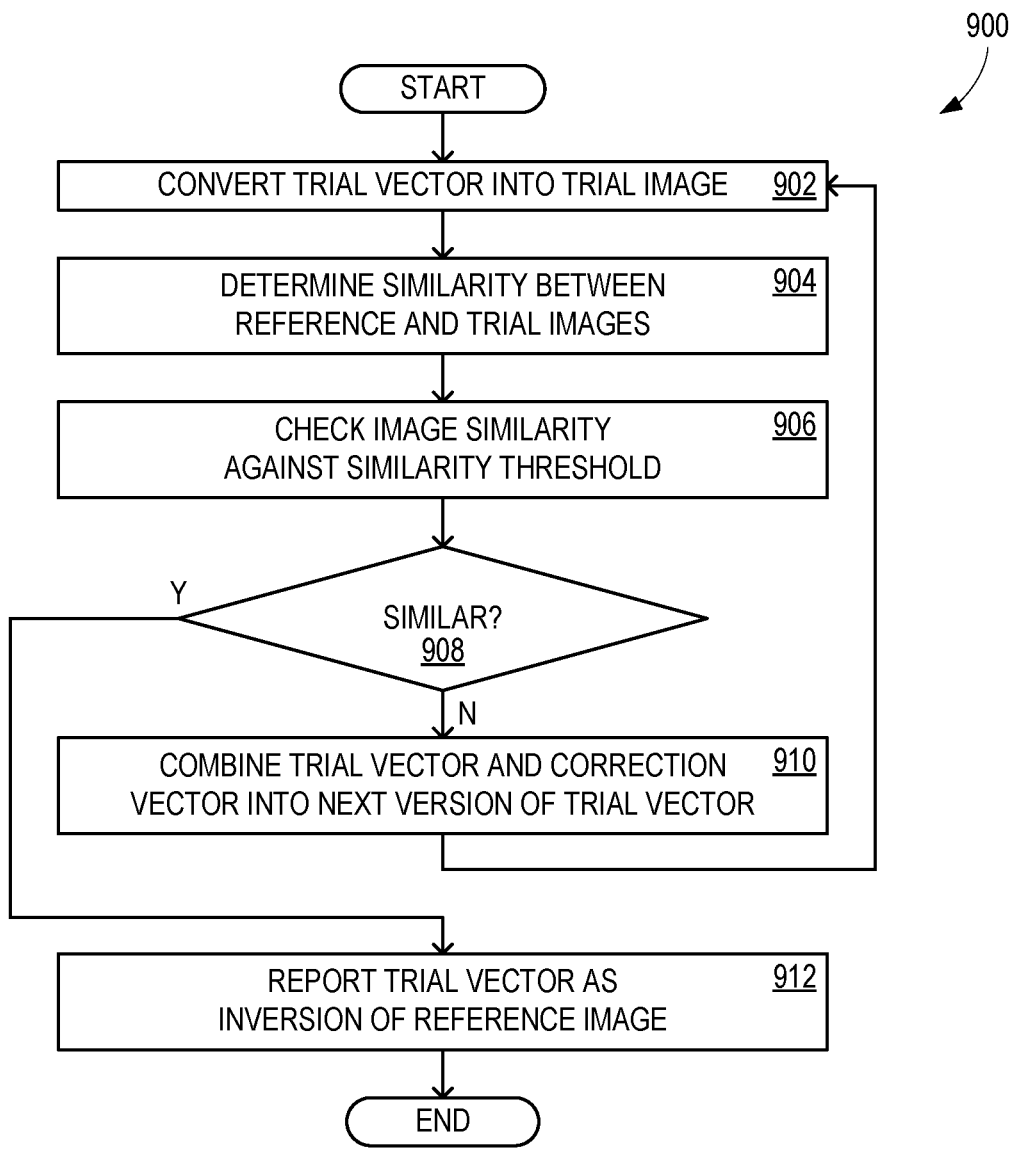
FIG. 9 shows a flowchart of example operations associated with some examples of the arrangement of FIG. 8B.

FIG. 9 shows a flowchart 900 of operations associated with some examples of arrangement 800b. In some examples, operations described for flowchart 900 are performed by computing device 1400 of FIG. 14. Flowchart 900 inverts a reference image (e.g., image 228) and commences with operation 902, which generates trial image 229 with trained generator 204, based on at least trial vector 219. Operation 904 determines the similarity between trial image 229 and image 228 (e.g., determines correction vector 811).

Operation 906 checks the similarity against similarity threshold 812. Decision operation 908 determines whether similarity threshold 812 is met. If not, then, based on the similarity between trial image 229 and image 228 not meeting similarity threshold 812, operation 910 combines trial vector 219 and correction vector 811 into a next version of trial vector 219. Flowchart 900 returns to operation 902. Operations 902-910 iterate until the similarity between trial image 229 and image 28 meets similarity threshold 812. When that occurs, flowchart moves to operation 912. Based on the similarity between trial image 229 and image 228 meeting similarity threshold 812, operation 912 returns trial vector 219 as the inversion of image 228 (e.g., reports trial vector 219 as vector 218).

FIG. 10 illustrates example visual search results 128 for query image 130, using arrangement 100. In some examples, visual search for images similar to query image 130 is performed for set of multiple catalog images 1002, which is within plurality of catalog images 102, but may be less than the entirety of plurality of catalog images 102 (e.g., set of multiple catalog images 1002 is a subset of plurality of catalog images 102). For example, if plurality of catalog images 102 contains thousands of images, set of multiple catalog images 1002 may be mere hundreds of images.

In FIG. 10, results 128 are shown in descending rank of similarity, from catalog image 102a being most similar to query image 130 to a catalog image 102e (which is also within plurality of catalog images 102) being the least similar to query image 130, within results 128 (but more similar than other images not shown within results 128). Although not all of catalog images 102a-102e are labeled, some are. These labels, however, were not relied upon during training of generator 204, because their presence cannot be guaranteed in all scenarios.

Catalog image 102a is labeled as a necklace, with a similarity score of 0.97 relative to query image 130. Catalog image 102b has an incorrect labeled 1004 as a bracelet, and a similarity score of 0.94 relative to query image 130. Catalog image 102c is labeled as a necklace (with a label 1006), and has a similarity score of 0.93 relative to query image 130. Catalog image 102d is an unlabeled image, and has a similarity score of 0.92 relative to query image 130. Catalog image 102e is labeled as a necklace, with a similarity score of 0.88 relative to query image 130.

Some examples of arrangement 100 are able to determine that catalog image 102d is unlabeled, and also determine that the most similar labeled image to it is catalog image 102c.

In such examples, label 1006 of catalog image 102*c* may be assigned to catalog image 102*d*, so that catalog image 102*d* is now properly labeled.

Some examples of arrangement 100 are also able to determine that label 1004 does not match label 1006, and further determine that it is label 1004 (rather than label 1006) that is incorrect. One way to make such a determination is that catalog image 102*c* is labeled consistently with multiple other similar images (e.g., catalog image 102*c* is labeled consistently with catalog images 102*a* and 102*e*), whereas catalog image 102*b* is labeled inconsistently with other similar images (or shares its label 1004 with fewer similar images than does catalog image 102*c*). In such examples, label 1004 may be changed to match label 1006 of catalog image 102*c* (which is the most similar labeled image), thereby correcting a mislabeled image in plurality of catalog images 102.

Figure 11:
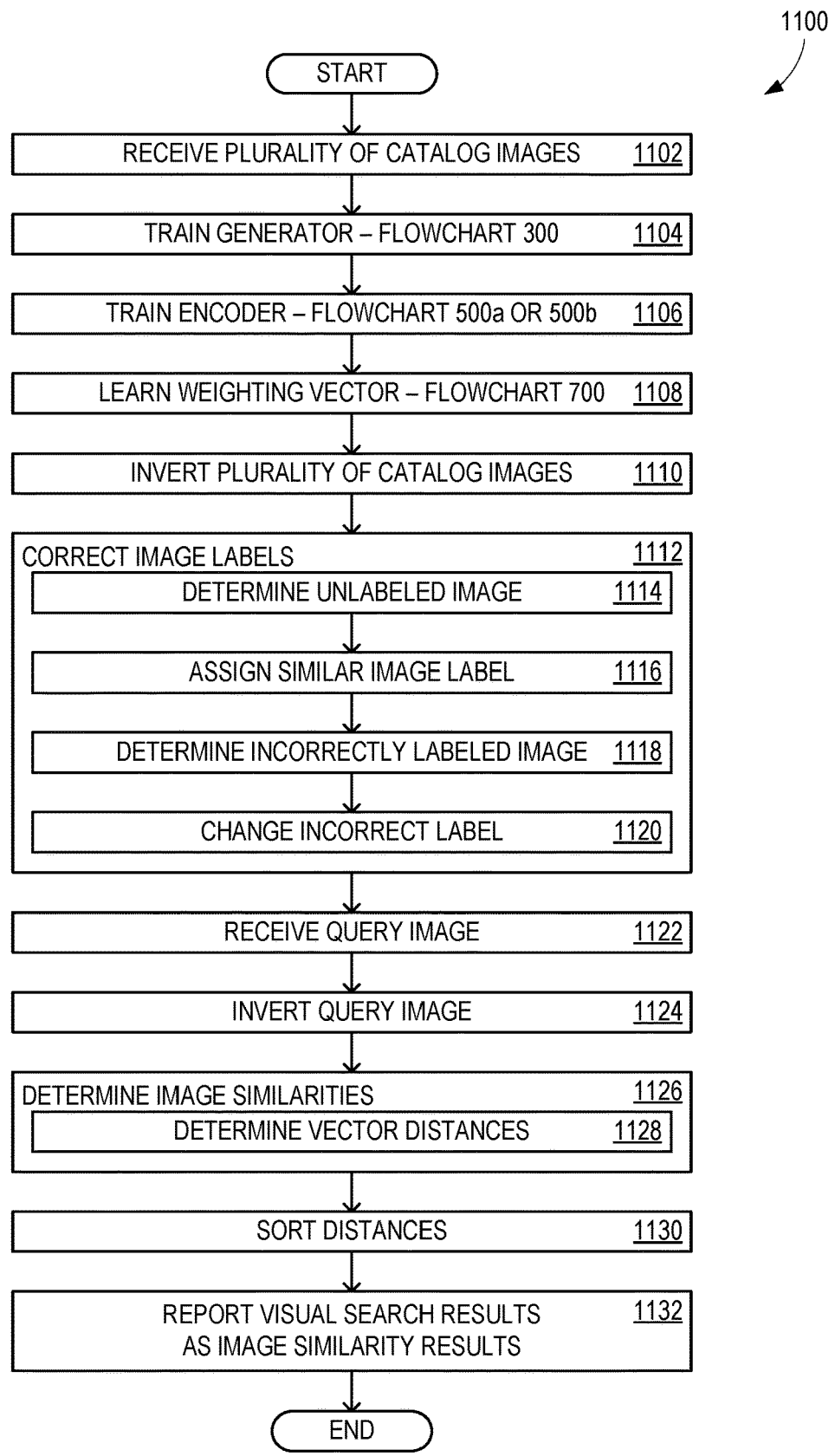
FIG. 11 shows a flowchart illustrating exemplary operations associated with some examples of the arrangement of FIG. 1.

FIG. 11 shows a flowchart 1100 illustrating exemplary operations associated with some examples of arrangement 100. In some examples, operations described for flowchart 1100 are performed by computing device 1400 of FIG. 14. Flowchart 1100 commences with operation 1102, which includes receiving plurality of catalog images 102. Operation 1104 trains generator 204 by training generative adversarial network 202 according to flowchart 300.

Operation 1106 trains encoder 402 with trained generator 204, according to flowchart 500*a* or flowchart 500*b*, for examples that use encoder 402 for inversion component 122. Operation 1108 learns weighting vector 602 according to flowchart 700, for examples that use weighted distances.

Operation 1110 inverts plurality of catalog images 102 into plurality of catalog vectors 142. In some examples, this includes, based on at least trained generator 204, inverting plurality of catalog images 102 into plurality of catalog vectors 142. In some examples, inverting an image comprises producing a vector with trained encoder 402 (see arrangement 800*a* of FIG. 8A). In some examples, inverting an image comprises producing a vector with trained generator 204, according to flowchart 900.

Some examples correct labels of plurality of catalog images 102 using operation 1112, which includes operations 114-1120. Operation 1114 determines a most similar labeled image of plurality of catalog images 102 for an unlabeled image (e.g., catalog image 102*d*) of plurality of catalog images 102. Operation 1116 assigning a label of the most similar labeled image to the unlabeled image (e.g., assigns label 1006 to catalog image 102*d*).

Operation 1118 includes, for a first labeled image (e.g., catalog image 102*b*) of plurality of catalog images 102, determining a most similar labeled image (e.g., catalog image 102*c*) of the plurality of catalog images as a second labeled image and, based on at least a label (e.g., label 1004) of the first labeled image not matching a label (e.g., label 1006) of the second labeled image, determining that the label (e.g., label 1004) of the first labeled image is incorrect. Operation 1120 changes the label (e.g., label 1004) of the first labeled image to match the label (e.g., label 1006) of the second labeled image.

At this point, visual search component 120 and plurality of catalog images 102 is ready to perform visual search and discovery. Visual search component 120 receives query image 130 as part of operation 1122, and inverts query image 130 into query vector 140 in operation 1124.

Operation 1126 determines a similarity between query image 130 and at least one catalog image of plurality of catalog images 102. In some examples, operation 1126 determines a similarity between query image 130 and each catalog image of set of multiple catalog images 1002, which is within plurality of catalog images 102. In some examples, determining the similarity between query image 130 and a catalog image comprises determining a distance between query vector 140 and a catalog vector of plurality of catalog vectors 142 that corresponds to the catalog image. This distance is a vector difference, and is determined using operation 1128. In some examples, determining a distance between two vectors comprises determining a cosine similarity. In some examples, determining a distance between two vectors comprises determining a Euclidean distance;

In some examples, determining the distance between query vector 140 and the catalog vector comprises, based on at least weighting vector 602, determining weighted distance 604 between query image 130 and the catalog vector. Operation 1120 sorts the distances between query image 130 and the catalog vector(s) (e.g., a set of multiple catalog vectors that correspond to set of multiple catalog images 1002 for which distances were determined). Some examples sort weighted distances. In some examples, sorting the distances between query image 130 and multiple catalog vectors comprises sorting image similarity according to prioritized image features.

Operation 1132 reporting the similarities based on at least a distance between query image 130 and each catalog vector that corresponds to a catalog image of set of multiple catalog images 1002 (or plurality of catalog images 102). This may include reporting the similarity based on at least the distance between query vector 140 and each catalog vector, and/or reporting the similarities according to prioritized image features, based on at least sorted weighted distances. In some examples reporting the similarities comprises reporting a ranking of the similarities and/or reporting similarity scores based on at least the distances between query vector 140 and the catalog vectors.

Figure 12:
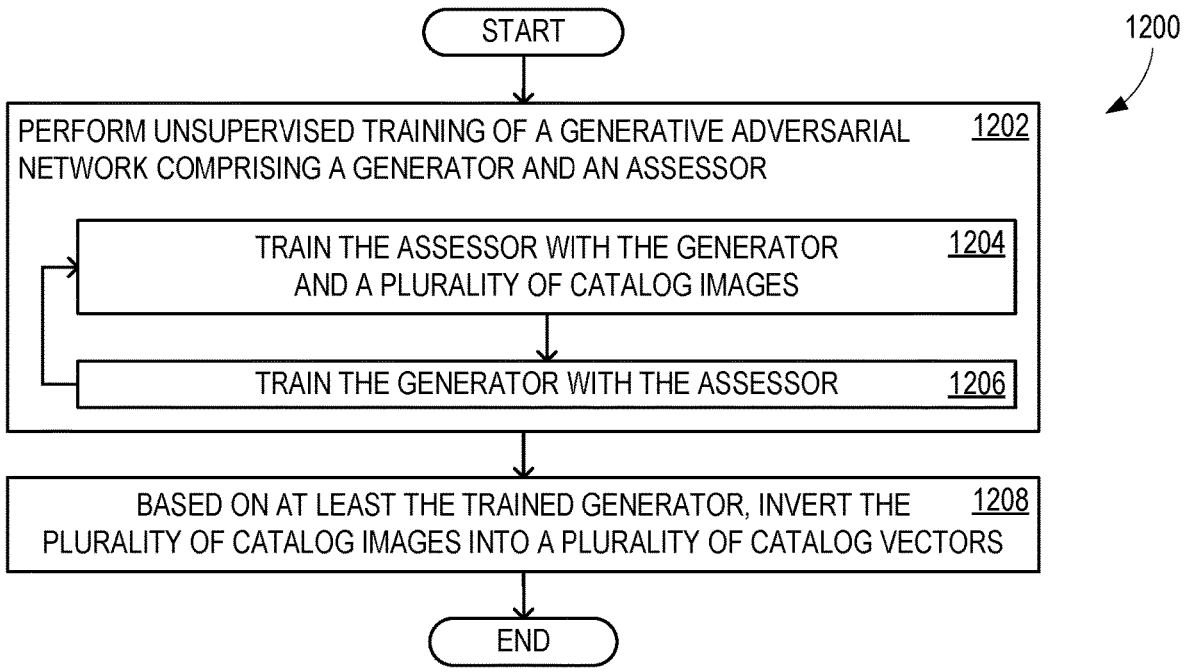
FIG. 12 shows another flowchart illustrating exemplary operations associated with some examples of the arrangement of FIG. 1.

FIG. 12 shows a flowchart 1200 illustrating exemplary operations involved in localizing relevant objects in multi-object images. In some examples, operations described for flowchart 1200 are performed by computing device 1400 of FIG. 14. Flowchart 1200 commences with operation 1202, which includes performing unsupervised training of a generative adversarial network comprising a generator and an assessor. Operation 1202 is performed by alternating operations 1204 and 1206.

Operation 1204 includes training the assessor with the generator and a plurality of catalog images. Operation 1206 includes training the generator with the assessor. Upon reaching a satisfactory training level for the generator, operation 1208 includes, based on at least the trained generator, inverting the plurality of catalog images into a plurality of catalog vectors.

Figure 13:
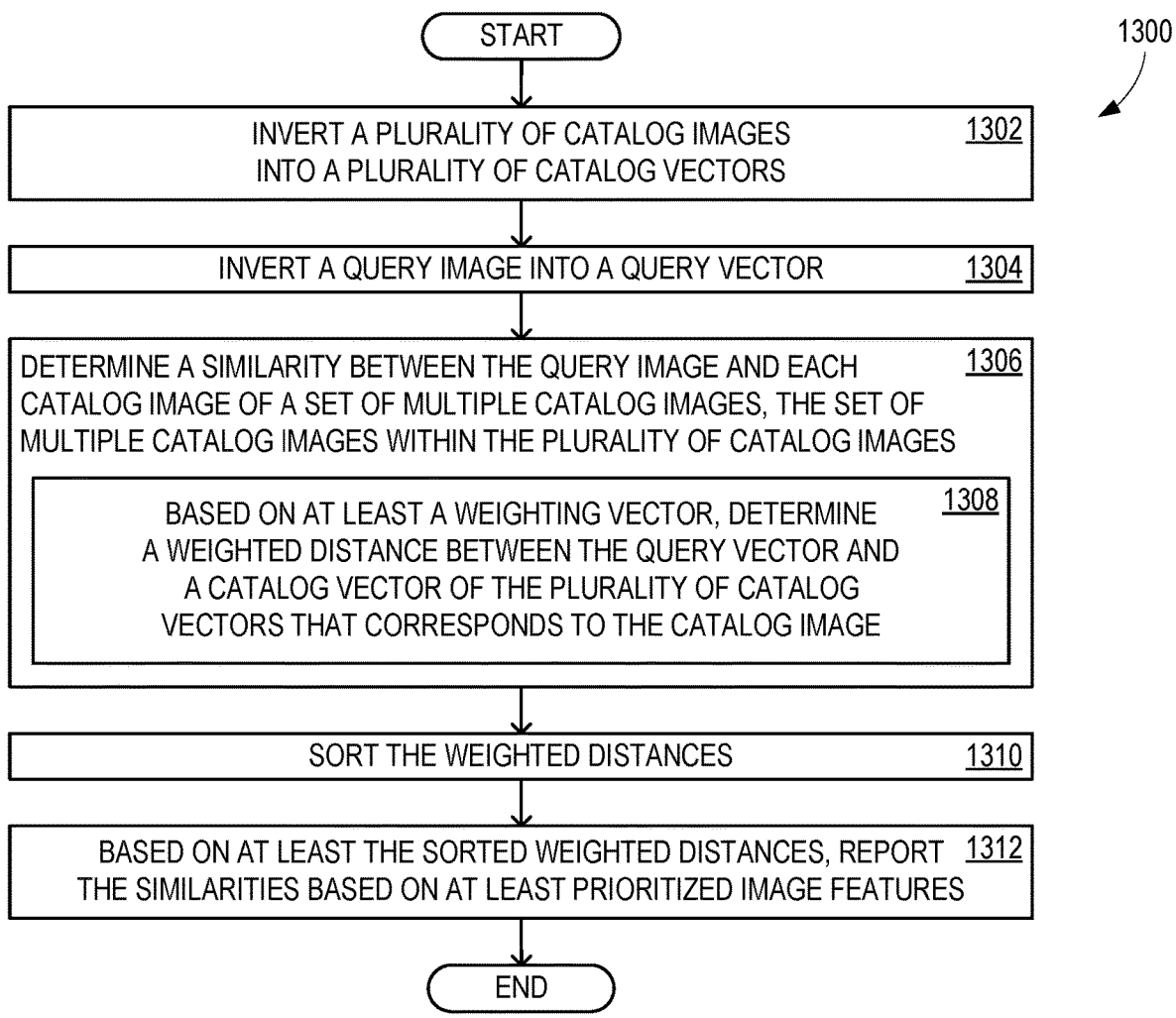
FIG. 13 shows another flowchart illustrating exemplary operations associated with some examples of the arrangement of FIG. 1.

FIG. 13 shows a flowchart 1300 illustrating exemplary operations involved in localizing relevant objects in multi-object images. In some examples, operations described for flowchart 1300 are performed by computing device 1400 of FIG. 14. Flowchart 1300 commences with operation 1302, which includes inverting a plurality of catalog images into a plurality of catalog vectors, and operation 1304 includes inverting a query image into a query vector.

Operation 1306 includes determining a similarity between the query image and each catalog image of a set of multiple catalog images, the set of multiple catalog images within the plurality of catalog images. Operation 1306 is performed using operation 1308, which includes, based on at least a weighting vector, determining a weighted distance between the query vector and a catalog vector of the plurality of catalog vectors that corresponds to the catalog image.

Operation 1308 includes sorting the weighted distances. Operation 1310 includes, based on at least the sorted weighted distances, reporting the similarities according to prioritized image features.

Additional Examples

An example system comprises: a processor; and a computer-readable medium storing instructions that are operative upon execution by the processor to: perform unsupervised training of a generative adversarial network comprising a generator and an assessor, wherein training the generative adversarial network comprises alternating: training the assessor with the generator and a plurality of catalog images; and training the generator with the assessor; and based on at least the trained generator, invert the plurality of catalog images into a plurality of catalog vectors.

An example computerized method comprises: performing unsupervised training of a generative adversarial network comprising a generator and an assessor, wherein training the generative adversarial network comprises alternating: training the assessor with the generator and a plurality of catalog images; and training the generator with the assessor; and based on at least the trained generator, inverting the plurality of catalog images into a plurality of catalog vectors.

Another example computerized method comprises: inverting a plurality of catalog images into a plurality of catalog vectors; inverting a query image into a query vector; determining a similarity between the query image and each catalog image of a set of multiple catalog images, the set of multiple catalog images within the plurality of catalog images, wherein determining the similarity between the query image and a catalog image comprises: based on at least a weighting vector, determining a weighted distance between the query vector and a catalog vector of the plurality of catalog vectors that corresponds to the catalog image; sorting the weighted distances; and based on at least the sorted weighted distances, reporting the similarities according to prioritized image features.

One or more example computer storage devices has computer-executable instructions stored thereon, which, on execution by a computer, cause the computer to perform operations comprising: performing unsupervised training of a generative adversarial network comprising a generator and an assessor, wherein training the generative adversarial network comprises alternating: training the assessor with the generator and a plurality of catalog images; and training the generator with the assessor; and based on at least the trained generator, inverting the plurality of catalog images into a plurality of catalog vectors.

Alternatively, or in addition to the other examples described herein, examples include any combination of the following:
  inverting a query image into a query vector;
  determining a similarity between the query image and at least one catalog image of the plurality of catalog images;
  determining the similarity between the query image and the catalog image comprises determining a distance between the query vector and a catalog vector of the plurality of catalog vectors that corresponds to the catalog image;
  reporting the similarity based on at least the distance between the query vector and the catalog vector;
  determining the distance between the query vector and the catalog vector comprises, based on at least a weighting vector, determining a weighted distance between the query vector and the catalog vector;
  determining a similarity between the query image and each catalog image of a set of multiple catalog images; the set of multiple catalog images is within the plurality of catalog images;
  reporting the similarities based on at least a distance between the query vector and each catalog vector that corresponds to a catalog image of the set of multiple catalog images;
  training an encoder with the trained generator;
  inverting an image comprises producing a vector with the trained encoder;
  inverting an image comprises: iterating until a similarity between a trial image and a reference image meets a similarity threshold: based on at least the trial vector, generating the trial image with the trained generator; determining the similarity between the trial image and the reference image; and based on the similarity between the trial image and the reference image not meeting the similarity threshold, combining the trial vector and a correction vector into a next version of the trial vector;
  based on the similarity between the trial image and the reference image meeting the similarity threshold, returning the trial vector as the inversion of the reference image.
  for at least one unlabeled image of the plurality of catalog images, determining a most similar labeled image of the plurality of catalog images;
  assigning a label of the most similar labeled image to the unlabeled image;
  for a first labeled image of the plurality of catalog images, determining a most similar labeled image of the plurality of catalog images as a second labeled image;
  based on at least a label of the first labeled image not matching a label of the second labeled image, determining that the label of the first labeled image is incorrect;
  changing the label of the first labeled image to match the label of the second labeled image.
  receiving a plurality of catalog images;
  receiving the query image;
  the generator comprises a neural network;
  the assessor comprises a neural network;
  the encoder comprises a neural network;
  learning the weighting vector;
  determining a distance between two vectors comprises determining a cosine similarity;
  determining a distance between two vectors comprises determining a Euclidean distance;
  determining distances between the query vector and a set of multiple catalog vectors that correspond to the set of multiple catalog images;
  sorting the distances between the query vector and the set of multiple catalog vectors;
  determining weighted distances between the query vector and the set of multiple catalog vectors that correspond to the set of multiple catalog images;
  sorting the weighted distances between the query vector and the set of multiple catalog vectors;
  sorting the distances between the query vector and the set of multiple catalog vectors comprises sorting image similarity according to prioritized image features;
  reporting the similarities comprises reporting a ranking of the similarities; and reporting the similarities comprises reporting similarity scores based on at least the distances between the query vector and the catalog vectors that corresponds to the set of multiple catalog images.

While the aspects of the disclosure have been described in terms of various examples with their associated operations, a person skilled in the art would appreciate that a combination of operations from any number of different examples is also within scope of the aspects of the disclosure.

Example Operating Environment

Figure 14:
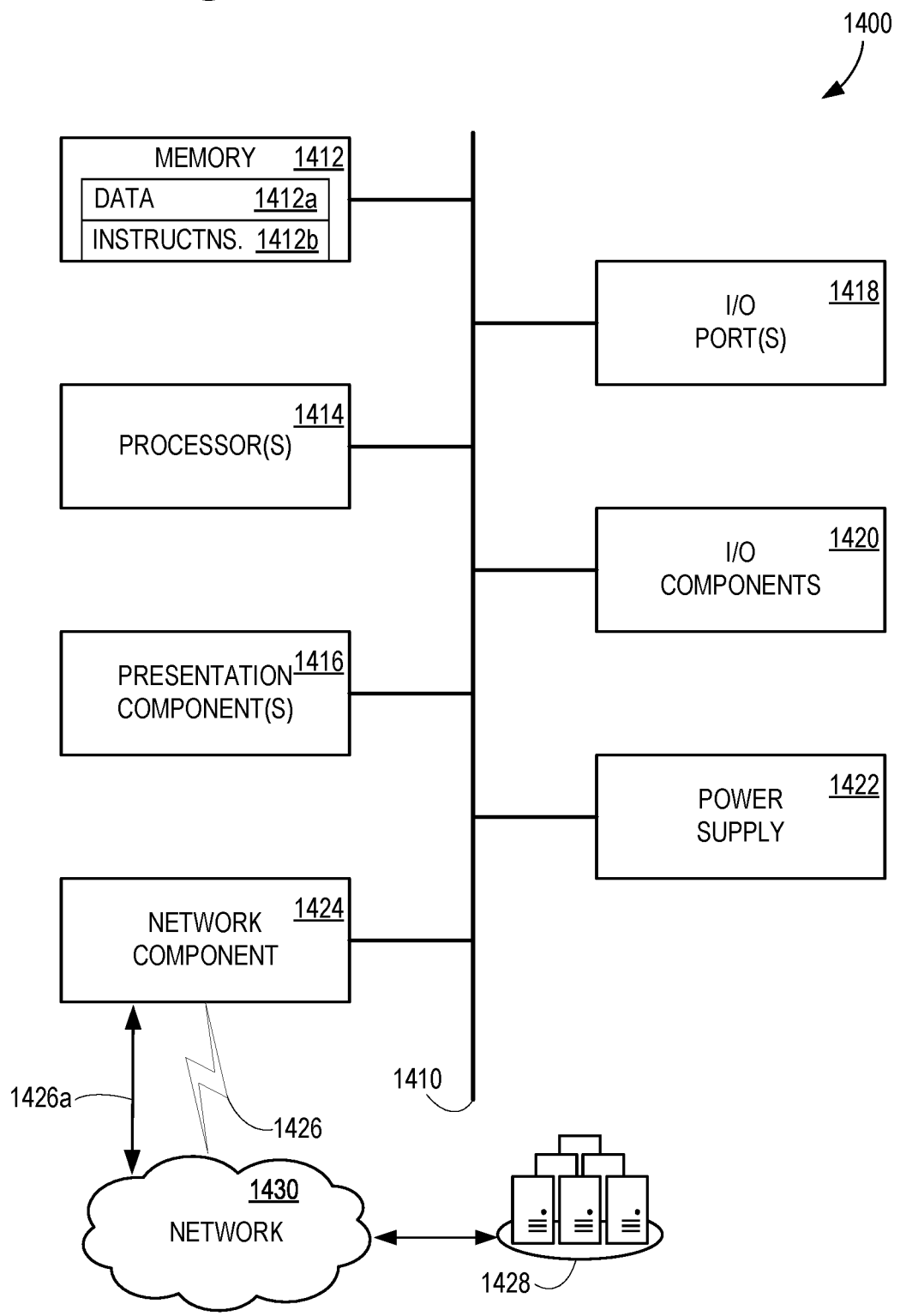
FIG. 14 shows a block diagram of an example computing environment suitable for implementing some of the various examples disclosed herein.

FIG. 14 is a block diagram of an example computing device 1400 for implementing aspects disclosed herein, and is designated generally as computing device 1400. Computing device 1400 is but one example of a suitable computing environment and is not intended to suggest any limitation as to the scope of use or functionality of the examples disclosed herein. Neither should computing device 1400 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1400 includes a bus 1410 that directly or indirectly couples the following devices: computer-storage memory 1412, one or more processors 1414, one or more presentation components 1416, I/O ports 1418, I/O components 1420, a power supply 1422, and a network component 1424. While computing device 1400 is depicted as a seemingly single device, multiple computing devices 1400 may work together and share the depicted device resources. For example, memory 1412 may be distributed across multiple devices, and processor(s) 1414 may be housed with different devices.

Bus 1410 represents what may be one or more busses (such as an address bus, data bus, or a combination thereof). Although the various blocks of FIG. 14 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 14 and the references herein to a "computing device." Memory 1412 may take the form of the computer-storage media references below and operatively provide storage of computer-readable instructions, data structures, program modules and other data for the computing device 1400. In some examples, memory 1412 stores one or more of an operating system, a universal application platform, or other program modules and program data. Memory 1412 is thus able to store and access data 1412$a$ and instructions 1412$b$ that are executable by processor 1414 and configured to carry out the various operations disclosed herein.

In some examples, memory 1412 includes computer-storage media in the form of volatile and/or nonvolatile memory, removable or non-removable memory, data disks in virtual environments, or a combination thereof. Memory 1412 may include any quantity of memory associated with or accessible by the computing device 1400. Memory 1412 may be internal to the computing device 1400 (as shown in FIG. 14), external to the computing device 1400 (not shown), or both (not shown). Examples of memory 1412 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 1400. Additionally, or alternatively, memory 1412 may be distributed across multiple computing devices 1400, for example, in a virtualized environment in which instruction processing is carried out on multiple computing devices 1400. For the purposes of this disclosure, "computer storage media," "computer-storage memory," "memory," and "memory devices" are synonymous terms for the computer-storage memory 1412, and none of these terms include carrier waves or propagating signaling.

Processor(s) 1414 may include any quantity of processing units that read data from various entities, such as memory 1412 or I/O components 1420. Specifically, processor(s) 1414 are programmed to execute computer-executable instructions for implementing aspects of the disclosure. The instructions may be performed by the processor, by multiple processors within computing device 1400, or by a processor external to computing device 1400. In some examples, processor(s) 1414 are programmed to execute instructions such as those illustrated in the flow charts discussed below and depicted in the accompanying drawings. Moreover, in some examples, processor(s) 1414 represent an implementation of analog techniques to perform the operations described herein.

Presentation component(s) 1416 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1400, across a wired connection, or in other ways. I/O ports 1418 allow computing device 1400 to be logically coupled to other devices including I/O components 1420, some of which may be built in. Example I/O components 1420 include, for example but without limitation, a microphone, joystick, game pad, satellite dish, scanner, printer, wireless device, etc.

Computing device 1400 may operate in a networked environment via network component 1424 using logical connections to one or more remote computers. In some examples, network component 1424 includes a network interface card and/or computer-executable instructions (e.g., a driver) for operating the network interface card. Communication between computing device 1400 and other devices may occur using any protocol or mechanism over any wired or wireless connection. In some examples, network component 1424 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1424 communicates over wireless communication link 1426 and/or a wired communication link 1426a to a cloud resource 1428 across network 1430. Various different examples of communication links 1426 and 1426a include a wireless connection, a wired connection, and/or a dedicated link, and in some examples, at least a portion is routed through the internet.

Although described in connection with an example computing device 1400, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprises:
   a processor; and
   a computer-readable medium storing instructions that are operative upon execution by the processor to:
   perform unsupervised training of a generative adversarial network comprising a generator and an assessor, wherein training the generative adversarial network comprises alternating:
   training the assessor with the generator and a plurality of catalog images and a plurality of synthetic images, the plurality of synthetic images generated by the generator based on the plurality of catalog images; and
   training the generator with the assessor;
   based on at least the trained generator, invert the plurality of catalog images into a plurality of catalog vectors;
   invert a query image into a query vector;
   determine a similarity between the query image and each catalog image of the plurality of catalog images, wherein determining the similarity between the query image and each catalog image comprises, based on a weighting vector, determining a weighted distance between the query vector and a catalog vector of the plurality of catalog vectors that corresponds to the catalog image;
report the similarities based on at least the weighted distances; and
based on the plurality of catalog vectors, perform correcting of a mislabeled image in the plurality of catalog images.

2. The system of claim 1, wherein correcting of the mislabeled image comprises:
for the mislabeled image, determining a most similar labeled image of the plurality of catalog images; and
assigning a label of the most similar labeled image to the mislabeled image.

3. The system of claim 1, wherein the weighting vector prioritizes certain image features when determining the similarity.

4. The system of claim 1, wherein the instructions are further operative to:
sort the weighted distances between the query image and the plurality of catalog vectors to report a ranking of the similarities.

5. The system of claim 1, wherein the instructions are further operative to:
train an encoder with the trained generator, wherein inverting an image comprises: producing a vector with the trained encoder.

6. The system of claim 1, wherein inverting an image comprises:
iterating until a similarity between a trial image and a reference image meets a similarity threshold:
based on at least a trial vector, generating the trial image with the trained generator;
determining the similarity between the trial image and the reference image; and
based on the similarity between the trial image and the reference image not meeting the similarity threshold, combining the trial vector and a correction vector into a next version of the trial vector; and
based on the similarity between the trial image and the reference image meeting the similarity threshold, returning the trial vector as an inversion of the reference image.

7. The system of claim 1, wherein the instructions are further operative to:
for at least one unlabeled image of the plurality of catalog images, determine a most similar labeled image of the plurality of catalog images; and
assign a label of the most similar labeled image to the unlabeled image.

8. A computerized method comprising:
performing unsupervised training of a generative adversarial network comprising a generator and an assessor, wherein training the generative adversarial network comprises alternating:
training the assessor with the generator and a plurality of catalog images and a plurality of synthetic images, the plurality of synthetic images generated by the generator based on the plurality of catalog images; and
training the generator with the assessor;
based on at least the trained generator, inverting the plurality of catalog images into a plurality of catalog vectors;

inverting a query image into a query vector;
determining a similarity between the query image and each catalog image of the plurality of catalog images, wherein determining the similarity between the query image and each catalog image comprises, based on a weighting vector, determining a weighted distance between the query vector and a catalog vector of the plurality of catalog vectors that corresponds to the catalog image;
reporting the similarities based on at least the weighted distances; and
based on the plurality of catalog vectors, performing correcting of a mislabeled image in the plurality of catalog images.

9. The computerized method of claim 8, wherein correcting of the mislabeled image comprises:
for the mislabeled image, determining a most similar labeled image of the plurality of catalog images; and
assigning a label of the most similar labeled image to the mislabeled image.

10. The computerized method of claim 8, wherein the weighting vector prioritizes certain image features when determining the similarity.

11. The computerized method of claim 8, further comprising: sorting the weighted distances between the query image and the plurality of catalog vectors to report a ranking of the similarities.

12. The computerized method of claim 8, further comprising:
training an encoder with the trained generator, wherein inverting an image comprises:
producing a vector with the trained encoder.

13. The computerized method of claim 8, wherein inverting an image comprises:
iterating until a similarity between a trial image and a reference image meets a similarity threshold:
based on at least a trial vector, generating the trial image with the trained generator;
determining the similarity between the trial image and the reference image; and
based on the similarity between the trial image and the reference image not meeting the similarity threshold, combining the trial vector and a correction vector into a next version of the trial vector; and
based on the similarity between the trial image and the reference image meeting the similarity threshold, returning the trial vector as an inversion of the reference image.

14. The computerized method of claim 8, further comprising:
for a first labeled image of the plurality of catalog images, determining a most similar labeled image of the plurality of catalog images as a second labeled image; and
based on at least a label of the first labeled image not matching a label of the second labeled image, determining that the label of the first labeled image is incorrect; and
changing the label of the first labeled image to match the label of the second labeled image.

15. One or more computer storage devices having computer-executable instructions stored thereon, which, on execution by a computer, cause the computer to perform operations comprising:
performing unsupervised training of a generative adversarial network comprising a generator and an assessor, wherein training the generative adversarial network comprises alternating:

training the assessor with the generator and a plurality of catalog images and a plurality of synthetic images, the plurality of synthetic images generated by the generator based on the plurality of catalog images; and training the generator with the assessor;

based on at least the trained generator, inverting the plurality of catalog images into a plurality of catalog vectors;

inverting a query image into a query vector;

determining a similarity between the query image and each catalog image of the plurality of catalog images, wherein determining the similarity between the query image and each catalog image comprises, based on a weighting vector, determining a weighted distance between the query vector and a catalog vector of the plurality of catalog vectors that corresponds to the catalog image;

reporting the similarities based on at least the weighted distances; and based on the plurality of catalog vectors, performing correcting of a mislabeled image in the plurality of catalog images.

16. The one or more computer storage devices of claim 15, wherein correcting of the mislabeled image comprises:

for the mislabeled image, determining a most similar labeled image of the plurality of catalog images; and assigning a label of the most similar labeled image to the mislabeled image.

17. The one or more computer storage devices of claim 15, wherein the weighting vector prioritizes certain image features when determining the similarity.

18. The one or more computer storage devices of claim 15, wherein the operations further comprise sorting the weighted distances between the query image and the plurality of catalog vectors to report a ranking of the similarities.

19. The one or more computer storage devices of claim 15, wherein the operations further comprise training an encoder with the trained generator, wherein inverting an image comprises: producing a vector with the trained encoder.

20. The one or more computer storage devices of claim 15, wherein inverting an image comprises:

iterating until a similarity between a trial image and a reference image meets a similarity threshold:

based on at least a trial vector, generating the trial image with the trained generator;

determining the similarity between the trial image and the reference image; and based on the similarity between the trial image and the reference image not meeting the similarity threshold, combining the trial vector and a correction vector into a next version of the trial vector; and based on the similarity between the trial image and the reference image meeting the similarity threshold, returning the trial vector as an inversion of the reference image.

* * * * *